United States Patent [19]

Hasushita

[11] Patent Number: 5,442,481
[45] Date of Patent: Aug. 15, 1995

[54] FINDER OPTICAL SYSTEM IN CAMERA
[75] Inventor: Sachio Hasushita, Tokyo, Japan
[73] Assignee: Asahi Kogaku Kabushiki Kaisha, Tokyo, Japan
[21] Appl. No.: 105,865
[22] Filed: Aug. 11, 1993
[30] Foreign Application Priority Data
  Aug. 18, 1992 [JP] Japan .................. 4-219185
[51] Int. Cl.6 .................. G02B 27/00; G03B 13/10
[52] U.S. Cl. .................. 359/614; 359/362; 359/601; 354/222
[58] Field of Search ........ 359/361, 601, 609, 611–614, 359/588, 580–581, 722, 723; 354/195.1–195.12, 199, 222, 233, 422

[56] References Cited
U.S. PATENT DOCUMENTS

| 3,971,951 | 7/1976 | Kikukawa et al. | 250/458.1 |
| 4,240,701 | 12/1980 | Lytle | 359/715 |
| 4,240,704 | 12/1980 | Goto | 359/774 |
| 4,367,927 | 1/1983 | Fujii | 359/681 |
| 4,725,130 | 2/1988 | Ozawa | 359/690 |
| 4,779,969 | 10/1988 | Sato et al. | 359/422 |
| 4,784,467 | 11/1988 | Akatsuka et al. | 359/588 |
| 4,812,023 | 3/1989 | Kikuchi | 359/689 |
| 4,842,395 | 6/1989 | Sato et al. | 359/380 |
| 4,854,680 | 8/1989 | Kikuchi | 359/689 |
| 4,909,615 | 3/1990 | Ueda | 359/683 |
| 4,963,005 | 10/1990 | Tsuji | 359/680 |
| 4,992,809 | 2/1991 | Nozaki et al. | 504/108 |
| 5,052,787 | 10/1991 | Sugawara | 359/683 |
| 5,086,353 | 2/1992 | Mukai et al. | 359/432 |
| 5,193,028 | 3/1993 | Noguchi | 359/581 |

FOREIGN PATENT DOCUMENTS
2241082A 8/1991 United Kingdom .

Primary Examiner—Loha Ben
Assistant Examiner—Thong Nguyen
Attorney, Agent, or Firm—Kane, Dalsimer, Sullivan, Kurucz, Levy, Eisele and Richard

[57] ABSTRACT

A real image type of finder optical system, provided separately from a photographing optical system. A real image is formed by an objective optical system and is observed through an ocular optical system. The objective optical system includes at least one lens that is made of synthetic resin and has at least one lens surface coated with an anti-reflection material.

5 Claims, 10 Drawing Sheets

FINDER OPTICAL SYSTEM IN CAMERA

BACKGROUND OF THE INVENTION

1. Field of the Invention

The present invention relates to a finder optical system in a camera. More precisely, the invention relates to a ghost image preventing optical system in a finder optical system which is separate from a photographing optical system.

2. Description of Related Art

Recently, finder optical systems or photographing optical systems having synthetic resin lenses have been widely used. This is due to the fact that synthetic resin lenses are inexpensive and can be freely and easily formed into a desired shape, such as an aspherical lens.

In a single lens reflex camera, the photographing optical system and the finder optical system are constituted by the same optical system. The photographing optical system is usually provided with an anti-reflection layer (hereinafter referred to as AFL) to prevent a ghost image from occurring. Consequently, in a single lens reflex camera, a ghost image will not occur in the finder optical system.

However, in a camera in which the photographing optical system is provided separately from the finder optical system, the same would not be true. The photographing optical system is subject to anti-reflection surface treatment to prevent a ghost image, similar to the single lens reflex camera, but nothing is done to prevent a ghost image from occurring in the finder optical system. The reason for this being that when light emitted from an eyepiece (i.e., ocular lens) in the finder optical system is incident upon viewer's eyes, the viewer usually does not see a ghost image, since the human eye naturally eliminates most ghost images. Synthetic resin lenses usually have a refractive index of 1.5~1.6 lower than other common optical elements. Consequently, in the finder optical system having a small reflectance and made of synthetic resin lenses, the ghost image is usually not apparent.

While it is unlikely that ghost images will appear in finder optical systems as described above, it cannot be assumed that these images will be absent in all cases. On the contrary, ghost images have been known to occur in recent real image type finder optical systems. According to a study conducted by the inventor of the present invention, a distinctive ghost image is likely to occur when a real image type of finder optical system has a large number of lens surfaces. In recent real image type finder optical systems, the lenses are separate so that the finder can be miniaturized and the power variability increased. Such a finder optical system is also beneficial for mass production. However, the number of lens surfaces in this type of finder optical system is greater than conventional finder optical systems in which the lenses are adhered to one another. Furthermore, the diameter of the lenses on the objective side in recent real image type finder optical systems is made larger than that of conventional finder optical systems to realize a wider angle lens. This results in light from outside of the field of view falling into the finder optical system, particularly at high magnification (i.e., high power).

SUMMARY OF THE INVENTION

It is an object of the present invention to provide an apparatus that prevents ghost images in a finder optical systems. In particular, the invention is directed towards the elimination of ghost images in real image type finder optical systems in which the finder optical system is separate from the photographing optical system. If the objective optical system comprises first and second lens assemblies (the order of lens assemblies hereinafter considered from the object side of the finder) in the optical axis direction, and the first lens group includes a lens made of synthetic resin, according to the preferred embodiment of the present invention, at least one lens surface thereof is coated with an AFL.

If the objective lens includes more than one (i.e., front and rear) lens assemblies, it is preferable that at least one lens surface of the synthetic resin lens of the first lens group or at least one lens surface of the synthetic resin lens of the second lens group is coated with an AFL.

Preferably, the synthetic resin lens to be coated with the AFL has the largest refractive index. Accordingly, if the objective optical system includes synthetic resin lenses made of acrylic resin and polycarbonate, the anti-reflection coating is preferably provided on the polycarbonate lens rather than the acrylic lens.

Preferably, the synthetic resin lens to be coated with the AFL has a negative power. To improve the chromatic aberration, it is preferable to select an optical material having a small Abbe number for a negative power lens and a large Abbe number for a positive power lens. However, there is a tendency that a material whose Abbe number is small has a high refractive index and a material whose Abbe number is large has a low refractive index. Consequently, taking the chromatic aberration into account, it is preferable that, of those lenses that cause the ghost image, the negative power synthetic resin lens is coated with an AFL.

It is possible to coat only two specific lens surfaces of the synthetic resin lens of the objective optical system with an AFL to reduce the manufacturing cost without substantially decreasing the technical effect of preventing a ghost image.

The two specific lens surfaces are preferably the first and second lens surfaces of the first synthetic resin lens of the first lens group. Alternatively, the two specific lens surfaces can be the second lens surfaces of the first synthetic resin lens of the first lens group and the second lens surfaces of the second synthetic resin lens of the first lens group.

The AFL is not limited to a specific material. For example, in the case of a single AFL, $MgF_2$ or $SiO_2$ can be used.

BRIEF DESCRIPTION OF THE DRAWINGS

The invention will be described below in detail with reference to the accompanying drawings, in which.

DESCRIPTION OF THE PREFERRED EMBODIMENT

Figure 1:
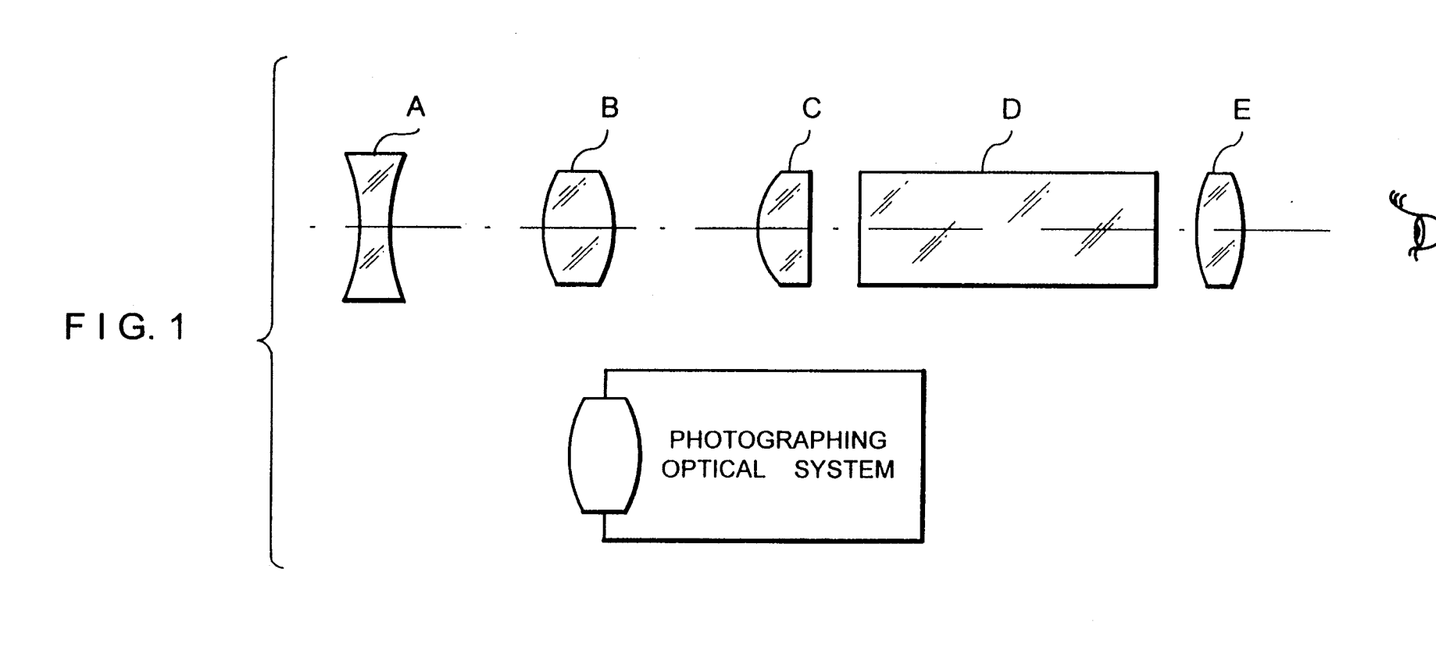
FIG. 1 is a conceptual view of a real image type of finder optical system to which the present invention is applied.

FIG. 1 shows a basic structure of a real image type of zoom finder to which the present invention is applied. The zoom finder is comprised of an objective lens system, including a first lens group A having negative power, a second lens group B having positive power, and a third lens group C having positive power, and an ocular optical system including an image inverting optical system D and a fourth lens group E having a positive power. A real image to be formed by the objective lens optical system is formed in the vicinity of the third lens C, and is then inverted in both the horizontal and vertical directions by the image inverting optical system D of the ocular optical system, so that an erect image can be viewed through the fourth lens group E. The zooming can be carried out by the movement of the first and second lens assemblies A and B in the optical axis direction in a predetermined relative relationship.

Figure 2:
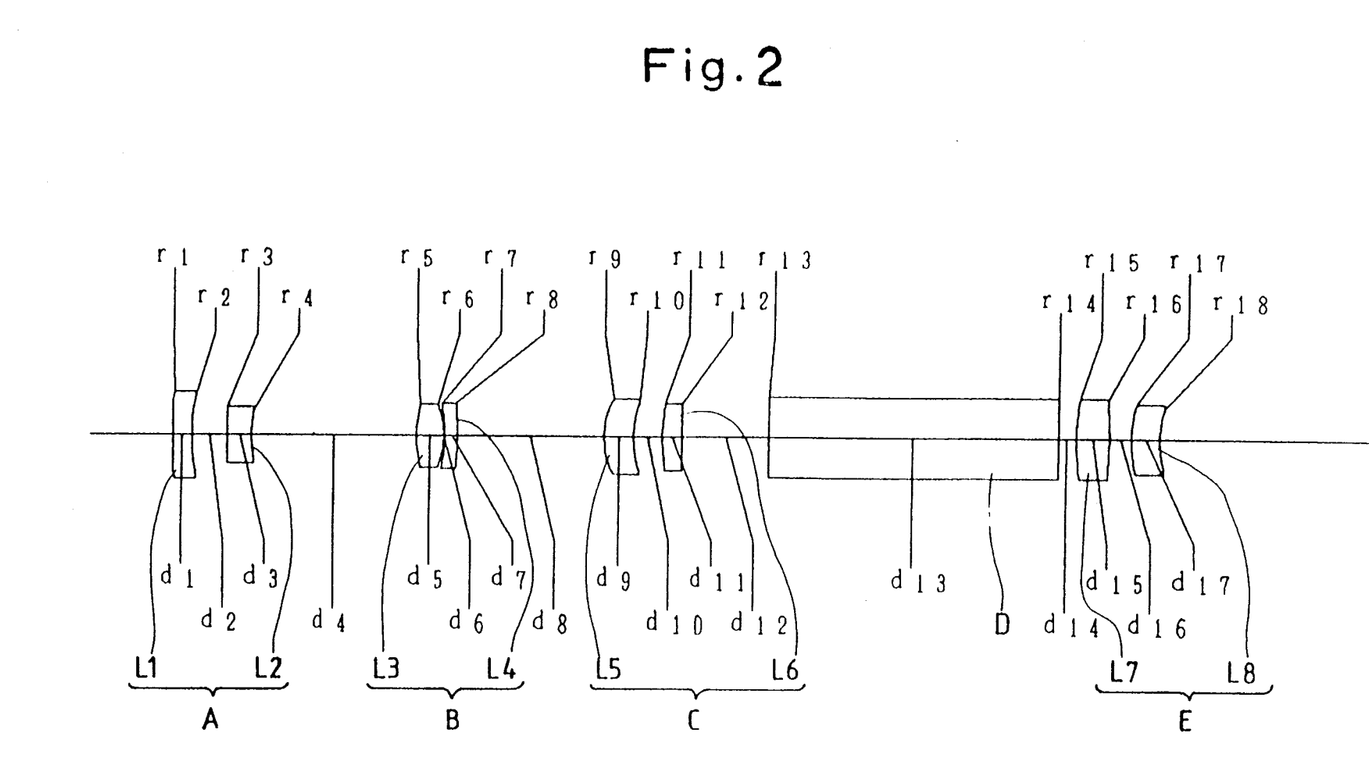
FIG. 2 shows an arrangement of optical elements of a real image type zoom finder in a wide angle position.
Figure 3:
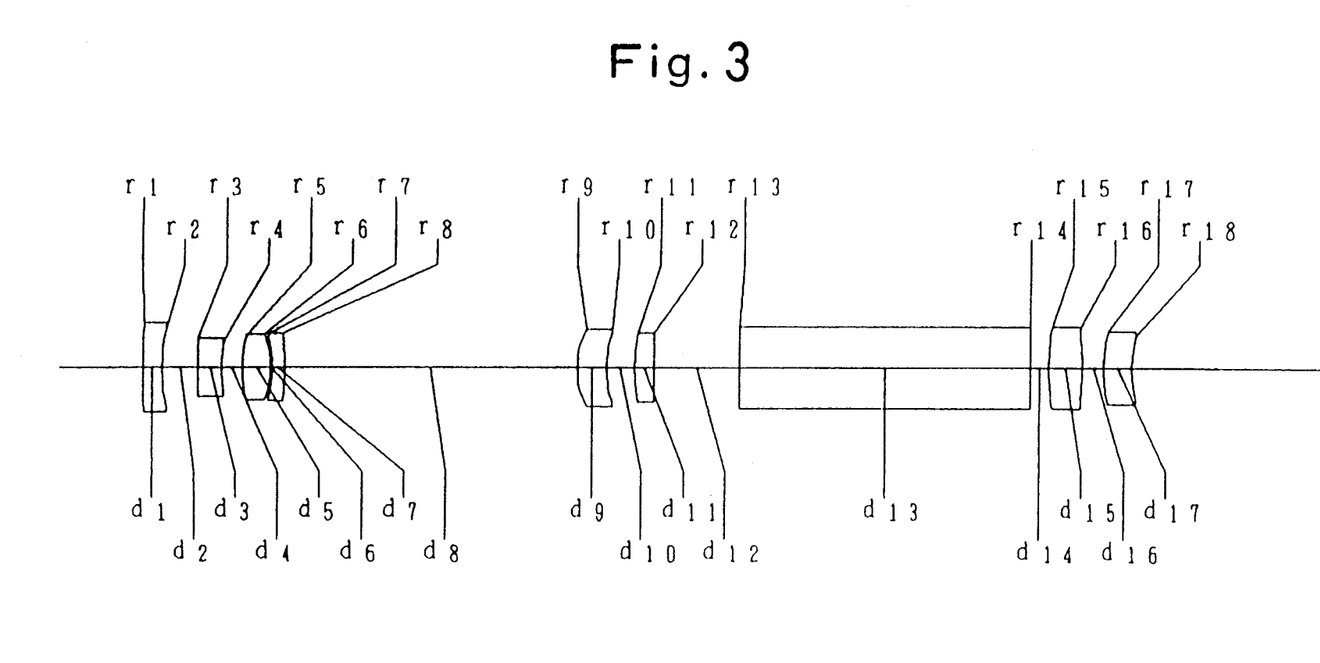
FIG. 3 shows an arrangement of optical elements of a real image type of zoom finder optical system, in a telephoto position.
Figure 4:
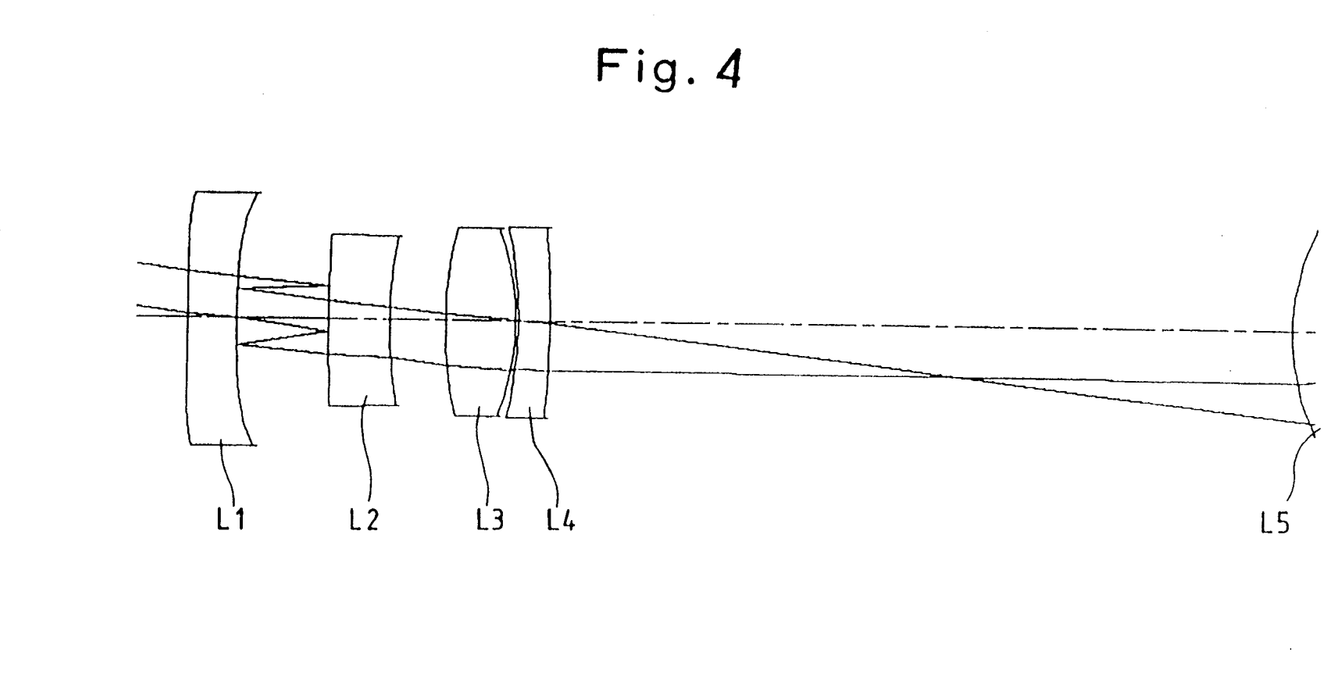
FIG. 4 is a schematic view of an optical path in the optical arrangement shown in FIG. 3, in a first position in which a ghost image occurs.
Figure 5:
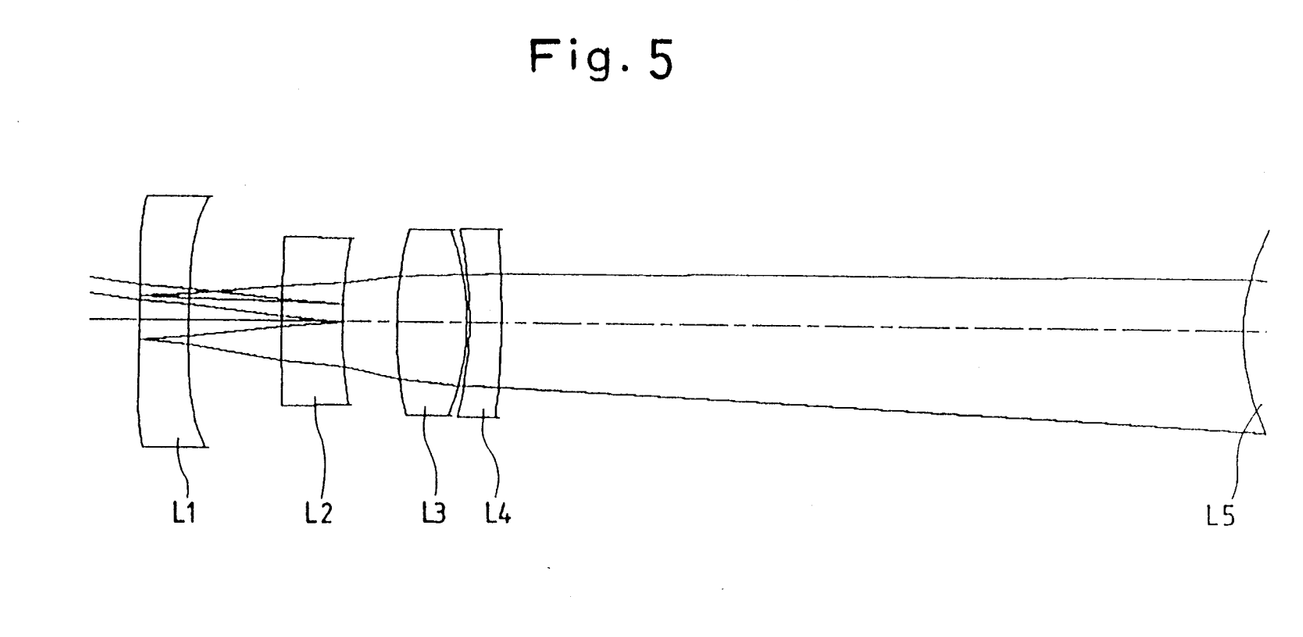
FIG. 5 is a schematic view of an optical path in the optical arrangement shown in FIG. 3, in a second position in which a ghost image occurs.
Figure 6:
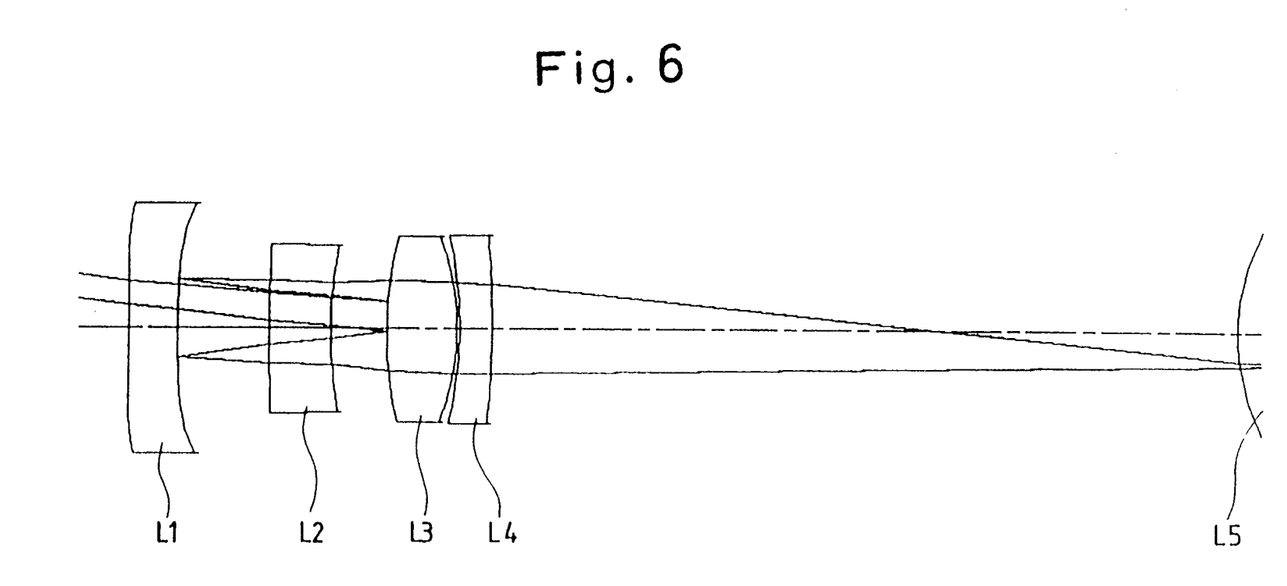
FIG. 6 is a schematic view of an optical path in the optical arrangement shown in FIG. 3, in a third position in which a ghost image occurs.
Figure 7:
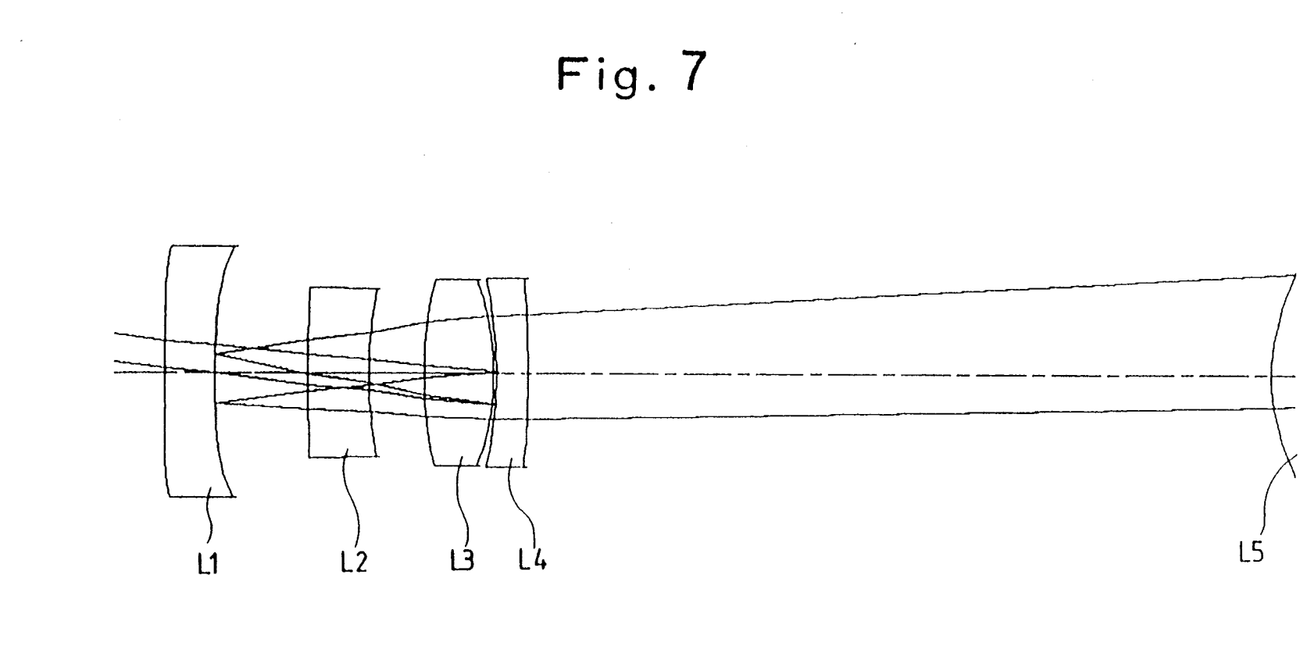
FIG. 7 is a schematic view of an optical path in the optical arrangement shown in FIG. 3, in a fourth position in which a ghost image occurs.
Figure 8:
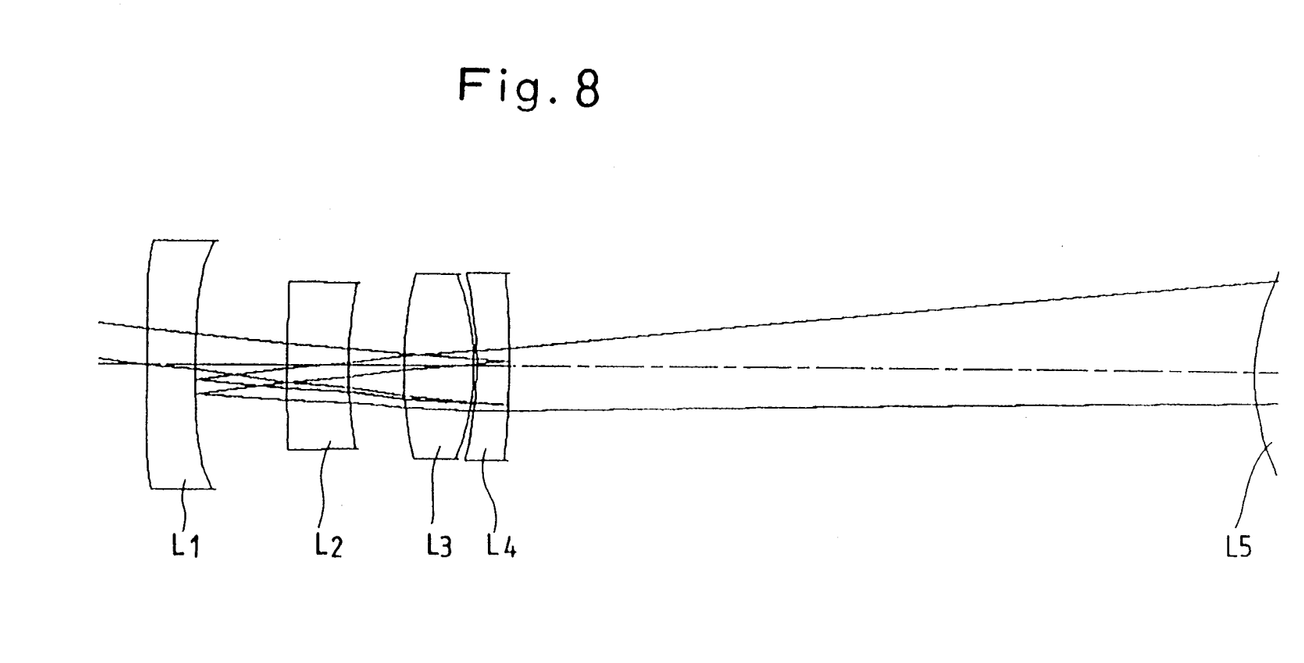
FIG. 8 is a schematic view of an optical path in the optical arrangement shown in FIG. 3, in a fifth position in which a ghost image occurs.
Figure 9:
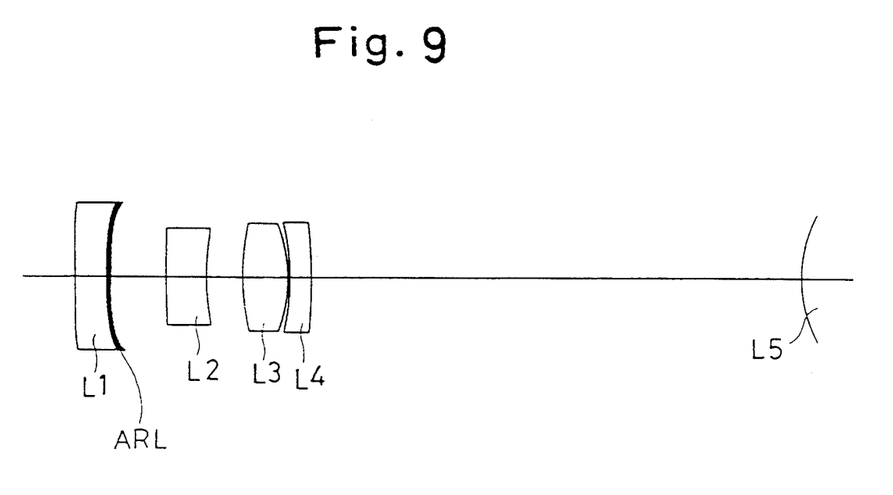
FIG. 9 is an illustrative view showing an AFL applied to a lens surface of the optical arrangement shown in FIG. 3 according to a first embodiment of the present invention.
Figure 10:
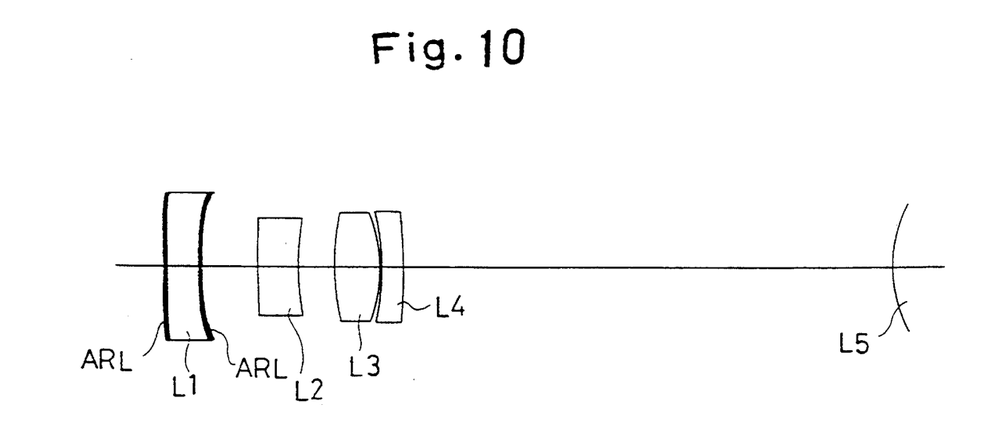
FIG. 10 is an illustrative view showing AFL applied to lens surfaces of the optical arrangement shown in FIG. 3 according to a second embodiment of the present invention; and, FIG. 11 is an illustrative view showing AFL applied to lens surfaces of the optical arrangement shown in FIG. 3 according to a third embodiment of the present invention.
Figure 11:
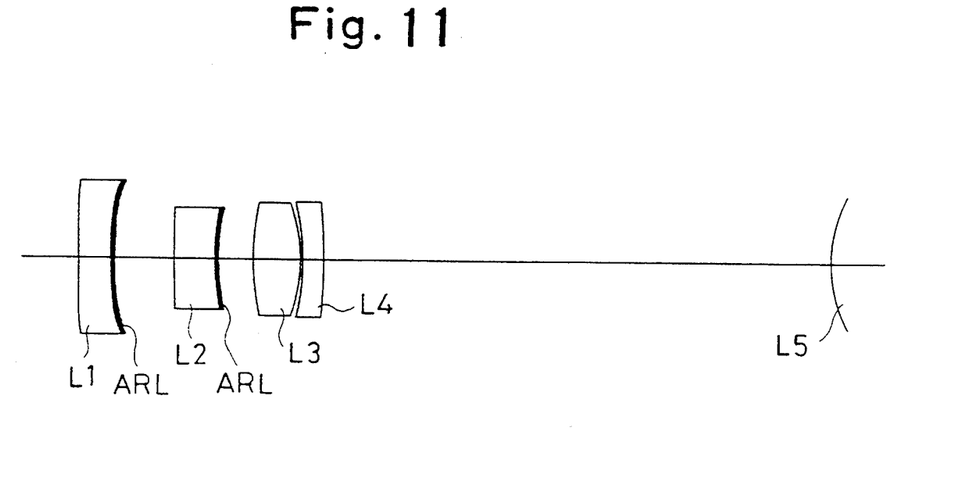

FIGS. 2 and 3 show a more practical arrangement of the optical elements of the real image type of zoom finder shown in FIG. 1, at a wide angle position and a telephoto position, respectively.

In FIGS. 2 and 3, the first lens group A of the objective optical system is comprised of a first lens L1 and a second lens L2. Similarly, the second lens group B is comprised of a third lens L3 and a fourth lens L4, and the third lens group C is comprised of a fifth lens L5 and a sixth lens L6, respectively. The image formed by the objective optical system is formed on a second lens surface of the sixth lens L6 or in the vicinity thereof. The image inverting optical system D is made of a Porro prism. The fourth lens group E is made of a seventh lens L7 and an eighth lens L8, respectively.

It has been determined that a ghost image is caused by the reflection of light on the lens surfaces within the objective optical system, and particularly on the lens surfaces of the first through fourth lenses L1~L4, in the telephoto position shown in FIG. 3.

FIGS. 4 through 8 and Table 1 below show the results of the analysis.

TABLE 1

| LENS | L1 | | L2 | | L3 | | L4 | |
|---|---|---|---|---|---|---|---|---|
| REFRACTIVE INDEX | 1.58547 | | 1.49176 | | 1.49176 | | 1.58547 | |

TABLE 1-continued

| LENS SURFACE | 1 | 2 | 1 | 2 | 1 | 2 | 1 | 2 |
|---|---|---|---|---|---|---|---|---|
| GHOST a (FIG.4) | | O | O | | | | | |
| GHOST b (FIG.5) | O | | | O | | | | |
| GHOST c (FIG.6) | | O | | | O | | | |
| GHOST d (FIG.7) | | O | | | | | O | |
| GHOST e (FIG.8) | | O | | | | | | O |
| FREQUENCY OF OCCURRENCE | 1 | 4 | 1 | 2 | 1 | 0 | 1 | 1 |

In Table 1 above, ghost images "a" through "e" are caused by the lens surfaces labelled O. In the bottom row labeled "FREQUENCY OF OCCURRENCE", note there are four occurrences of ghost images "a", "c", "d" and "e" caused by the second lens surface of the first lens L1. Consequently, it is most advantageous to coat the second lens surface of the first lens L1 with an AFL to thereby eliminate or restrict the occurrence ghost images "a", "c", "d" and "e". In this embodiment, since the AFL is only applied to a single lens surface, the ghost images are significantly reduced at a low cost. Furthermore, production costs for the lens system of this embodiment are low since lens L1 is made of polycarbonate having a high-refractive index of 1.58547 and is a negative lens, which is easy to produce.

In addition to the above, the ghost image "b" can be prevented by coating the first lens surface of the first lens L1. In this embodiment all of the ghost images "a" through "e" can be eliminated or weakened. It is also possible to coat the second lens surface of the second lens L2 with an AFL, in addition to the second lens surface of the first lens L1, to prevent the ghost image "b" from occurring. This embodiment also serves to eliminate or weaken all of the ghost images "a" through "e".

If only one of the first lens surface of the first lens L1 and the second lens surface of the second lens L2 is coated with an AFL, the occurrence of the ghost image "b" can be more effectively prevented when the first lens surface of the first lens L1 is coated than when the second lens surface of the second lens L2, whose refractive index is lower than that of the first lens surface of the first lens L1, is coated, since there is no significant difference in incident angle of light between the first lens surface of the first lens L1 and the second lens surface of the second lens L2, as can be seen in the drawings.

If one or more surfaces of the third lens or the fourth lens is provided with an AFL in addition to any of the above designs, there will only be a slight reduction in the occurrence of ghost images. Accordingly, it is impractical to provide AFL on the third and forth lens surfaces since only a minimal effect can be expected at the additional cost.

Tables 2 and 3 show lens data of a real image type of zoom finder shown in FIGS. 2 and 3, respectively.

TABLE 2

| | Wide-angle | Telephoto |
|---|---|---|
| Finder Magnification | 0.34 times | 0.87 times |
| Diopter (3 m) | −0.99 dp | −0.94 dp |
| Real field of View (2ω) | 38.6° | 15.0° |

TABLE 3

| No | $r_{No}$ | $D_{No}$ | n | ν |
|---|---|---|---|---|
| 1* | −99.033 | 1.50 | 1.58547 | 29.9 |
| 2* | 26.607 | 2.88 | — | — |
| 3* | 31.670 | 1.90 | 1.49176 | 57.4 |
| 4* | 10.116 | 13.25(WIDE) ~1.72(TELE) | — | — |
| 5* | 10.744 | 2.17 | 1.49176 | 57.4 |
| 6 | −7.033 | 0.10 | — | — |
| 7* | −11.065 | 1.00 | 1.58547 | 29.9 |
| 8* | −28.387 | 11.67(WIDE) ~23.24(TELE) | — | — |
| 9* | 6.392 | 2.33 | 1.49176 | 57.4 |
| 10 | 7.326 | 2.26 | — | — |
| 11* | 10.981 | 1.59 | 1.49176 | 57.4 |
| 12 | ∞ | 6.80 | — | — |
| 13 | ∞ | 23.00 | 1.49176 | 57.4 |
| 14 | ∞ | 1.40 | — | — |
| 15 | 15.499 | 2.71 | 1.49176 | 57.4 |
| 16* | −25.133 | 1.70 | — | — |
| 17 | 13.317 | 2.21 | 1.58547 | 29.9 |
| 18 | 10.000 | — | — | — |

Note:
"*" designates an aspherical lens surface.

In Tables above, n=1.58547 n=1.49176 correspond to the refractive indexes of polycarbonate and acrylic resin, respectively. In the illustrated embodiment, the lenses are all made of synthetic resin.

Aspherical lens data is as follows.

No.1: $K=0.0$, $A4=0.84501\times 10^{-3}$, $A6=0.26252\times 10^{-4}$, $A8=-0.19292\times 10^{-6}$ No.2: $K=0.0$, $A4=0.94044\times 10^{-3}$, $A6=0.43475\times 10^{-4}$, $A8=0.24355\times 10^{-5}$ No.3: $K=0.0$, $A4=-0.20795\times 10^{-2}$, $A6=0.94285\times 10^{-4}$, $A8=-0.21367\times 10^{-5}$ No.4: $K=0.0$, $A4=-0.22099\times 10^{-2}$, $A6=0.72579\times 10^{-4}$, $A8=-0.19859\times 10^{-5}$ No.5: $K=0.0$, $A4=-0.36067\times 10^{-3}$, $A6=-0.83712\times 10^{-5}$, $A8=-0.64415\times 10^{-6}$ No.8: $K=0.0$, $A4=0.18557\times 10^{-3}$, $A6=0.80469\times 10^{-5}$, $A8=-0.11070\times 10^{-5}$ No.9: $K=0.0$, $A4=0.11753\times 10^{-3}$, $A6=-0.15427\times 10^{-4}$ No.11: $K=0.0$, $A4=-0.33308\times 10^{-2}$, $A6=0.18300\times 10^{-3}$, $A8=-0.33901\times 10^{-5}$ No.16: $K=0.0$, $A4=0.81400\times 10^{-4}$, $A6=-0.28670\times 10^{-6}$ Note that the aspherical lens surface is defined by:

$$x=cy^2/[1+\{1-(1+K)c^2y^2\}^{\frac{1}{2}}]+A4y^4+A6y^6+A8y^8$$

As can be understood from the above discussion, according to the present invention, a camera having a real image type of finder optical system separate from a photographing optical system is provided, wherein a clear real image formed by an objective optical system can be observed through an ocular optical system without being obstructed by a ghost image.

I claim:

1. A real image type of finder optical system, provided separately from a photographing optical system, in which a real image is formed by an objective optical system, wherein said objective optical system includes lenses having different refractive indexes, including one lens having a highest refractive index and further includes an anti-reflection coating material on a surface of the lens that has the highest refractive index and no anti-reflection coating on at least one surface of a lens other than the lens having the highest refractive index.

2. A real image type of finder optical system, provided separately from a photographing optical system, in which a real image is formed by an objective optical system, wherein said objective optical system comprises at least one lens that is made of polycarbonate and one lens that is not made of polycarbonate and said polycarbonate lens has at least one lens surface coated with an anti-reflection material.

3. The finder system of claim 2 wherein said lens that is not made of polycarbonate is made of acrylic.

4. A real image type of finder optical system, provided separately from a photographing optical system, in which a real image is formed by an objective optical system, wherein said objective optical system includes a positive power lens and a synthetic resin lens having a negative power and further comprising an anti-reflection material coated on a surface of said negative power lens and no anti-reflection coating on a surface of said positive power lens.

5. The finder system of claim 4 wherein the anti-reflection material is coated on a surface of the negative power lens which has the highest refractive index.

* * * * *

UNITED STATES PATENT AND TRADEMARK OFFICE
CERTIFICATE OF CORRECTION

PATENT NO. : 5,442,481
DATED : August 15, 1995
INVENTOR(S) : Sachio Hasushita

It is certified that error appears in the above-indentified patent and that said Letters Patent is hereby corrected as shown below:

On the title page, Item [73], list the Assignee's name to read as follows:

ASAHI KOGAKU KOGYO KABUSHIKI KAISHA

Signed and Sealed this

Tenth Day of December, 1996

Attest:

BRUCE LEHMAN

Attesting Officer

Commissioner of Patents and Trademarks